T. B. VAN AUKEN.
LATHE TOOL HOLDER.
APPLICATION FILED MAY 20, 1913. RENEWED OCT. 22, 1914.
1,133,591.
Patented Mar. 30, 1915.
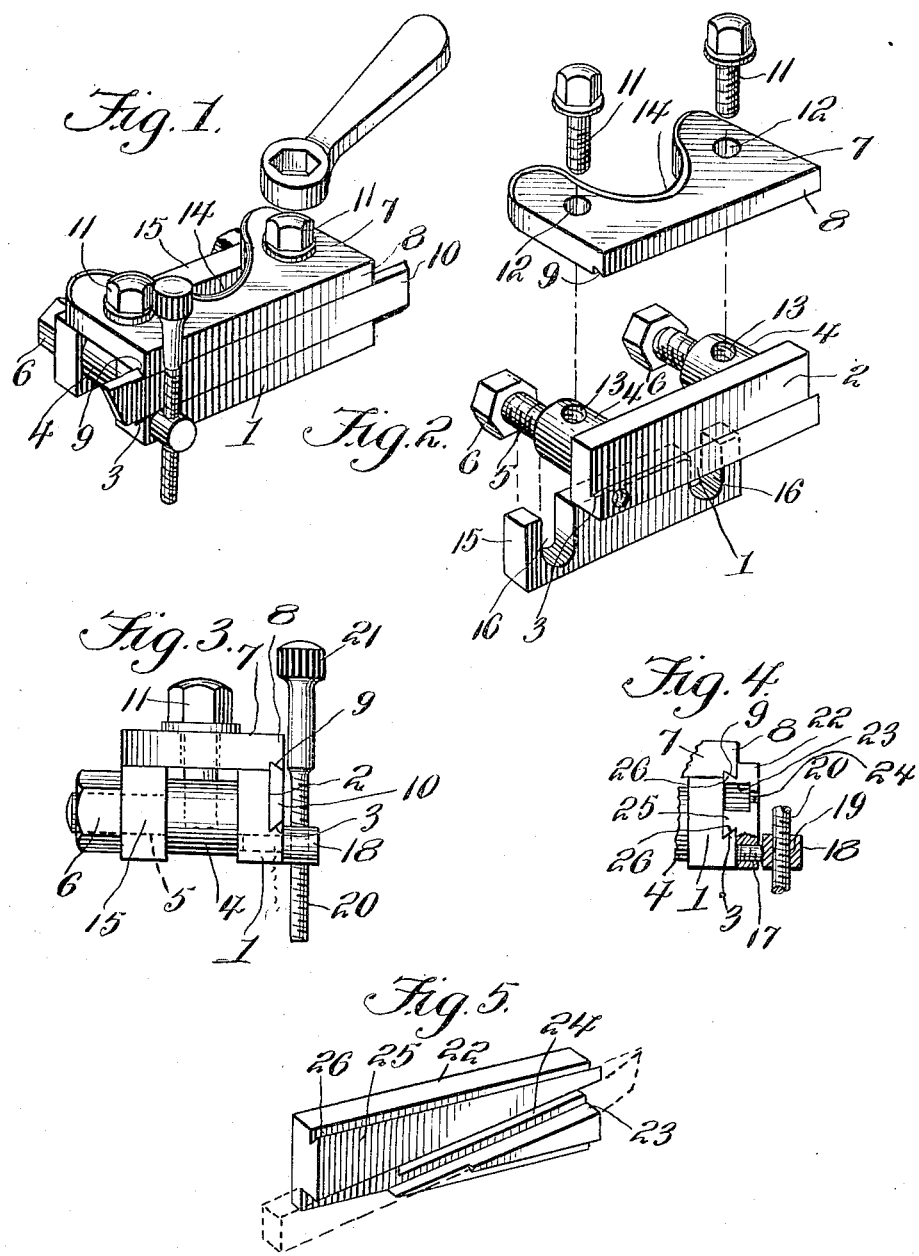
WITNESSES
J. L. Wright
D. W. Gould
INVENTOR
Thomas B. Van Auken
J. F. Byrne
Attorney

UNITED STATES PATENT OFFICE.

THOMAS B. VAN AUKEN, OF AUBURN, NEW YORK.

LATHE TOOL-HOLDER.

1,133,591. Specification of Letters Patent. Patented Mar. 30, 1915.

Application filed May 20, 1913, Serial No. 768,709. Renewed October 22, 1914. Serial No. 868,148.

*To all whom it may concern:*

Be it known that I, THOMAS B. VAN AUKEN, a citizen of the United States, residing at Auburn, in the county of Cayuga and State of New York, have invented certain new and useful Improvements in Lathe Tool-Holders, of which the following is a specification.

The invention relates generally to an improvement in tool holders, and particularly to a tool holder adapted for ready coöperation with the usual lathe tool post and constructed to provide for the convenient and accurate adjustment of the holder and tool without necessitating the use of the usual shims for the purpose.

The main object of the present invention is the provision of a tool holder in which tools of various types may be readily secured, the said holder including a transversely operating adjusting screw whereby the tool may be arranged and secured in any desired adjustment longitudinally of the tool post.

The invention in the preferred form of details, will be described in the following specification, reference being had particularly to the accompanying drawings, in which:—

Figure 1 is a perspective view of the improved tool holder. Fig. 2 is a similar view, with the parts shown separated. Fig. 3 is an end elevation of the tool holder. Fig. 4 is a broken end elevation illustrating the application of the auxiliary clamp for receiving tools of a particular type. Fig. 5 is a perspective view of such auxiliary clamp, a tool being shown in place therein.

The improved tool holder comprises what I term a main clamping plate 1, arranged on edge, and having the outer surface formed with a longitudinally extending tool receiving recess 2. This recess opens through the upper edge of the plate, but not through the lower edge thereof, its lower boundary being formed by an undercut wall 3. Circular studs 4 project from that face of the plate opposite the recess, being arranged adjacent the respective ends of the plate, and diametrically reduced beyond the surface of the plate to form what may be termed bolts 5, the latter being exteriorly threaded for the reception of nuts 6, for a purpose which will later appear. An edge clamping plate 7 is arranged for coöperation with the main clamping plate 1, said plate 7 being designed to rest upon the upper edge of the main clamping plate and at right angles to said main clamping plate, the edge clamping plate projecting beyond the recessed surface of the main clamping plate to present an edge 8 coextensive with the thickness of the wall 3 of said recess. The projecting portion 8 of the edge clamping plate is undercut at 9 to form in effect the opposing undercut wall of the recess 2. By this arrangement the main and edge clamping plates together form a tool receiving recess having opposing undercut walls to receive and hold the tool 10, as will be apparent from Fig. 1 of the drawing. The edge clamping plate is secured in place by clamping screws 11 passing through openings 12 formed in said plate inwardly beyond the main clamping plate, said screws taking into threaded openings 13 in the studs 4. Intermediate the openings 12 the edge clamping plate is reduced in width as at 14 to permit the coöperation of the holder with the tool post.

A tool post engaging plate 15 is provided, being arranged on edge, or in parallel relation to the main clamping plate. Said plate 15 is slotted at 16 from one edge to coöperate with the bolts 5, the nuts 6 securing the engaging plate in place. In this position the slotted edge of the engaging plate bears beneath and against the edge clamping plate, so that the screws 11 aid in preventing independent movement of the engaging plate in one direction.

One of the important features of the present invention is the provision of means whereby the tool holder may be readily and accurately adjusted in the tool post without the use of the usual shims. In carrying out this feature of the invention I secure in the relatively forward portion of the main clamping plate below the recessed wall 3 a stud 17, which may be swiveled, threaded, or otherwise connected with the clamping plate. The stud 17 is provided with an enlarged head 18 having a diametrically extending opening 19 interiorly threaded for the reception of an elongated adjusting screw 20, the latter having the usual milled operating head 21. The adjusting screw is of such length and so threaded that it is capable of considerable adjustment transverse the main clamping plate, as will be apparent from Fig. 3 of the drawings.

From the foregoing it will be seen that the tool holder includes a plate adapted to be permanently secured in the tool post, a tool carrier adjustably connected to the plate, and an adjusting screw mounted on the carrier by means of which it may be adjusted in a vertical direction with relation to the plate and tool post.

In the use of the device, with the parts assembled and a particular tool clamped in position, the holder is inserted in the usual tool post by removing the plate or bar 15 from the tool clamp and placing it in the post opening with the open ends of the slots 16 disposed uppermost, securing it in place upon the usual wedge base, by the tool post fastening screw. After the plate or bar 15 has been secured in the tool post, the tool clamp is applied to the plate by passing the bolts 5 down into the slots 16, which owing to their elongation permit the clamp to be adjusted with relation to the plate or bar 15. The tool holder is secured to the plate or bar 15 by means of the nuts 6. In this position that portion of the tool post on one side of the opening therein passes upwardly between the studs 4 and through the reduced portion 14 of the edge clamping plate. The lower end of the adjusting screw 20 rests upon the circular base of the tool post at all times. When adjustment of the tool in its position in the tool post is required, it is obviously only necessary to slack off the nut 6 and operate the adjusting screw 20 in the desired direction and to the desired extent. After the tool has been adjusted the nuts 6 are tightened. The adjusting screw will operate as a means to fix the tool holder against change after adjustment, and while providing a simple, quick, and effective means to accomplish such adjustment is of further advantage in dispensing with the usual shims for this purpose.

In the use of particular tools it may be found desirable to use an auxiliary clamping means, and to this end I contemplate the use of what I term an auxiliary clamping block 22 formed in its relatively inner surface with a tool receiving recess 23, shown diagonally arranged in this instance, the bottom wall of the recess being longitudinally slotted at 24 for a portion of its length to permit the necessary clamping movement of the opposing walls of the recess. The clamp block is provided on that surface in which the recess is formed with a projecting section or web 25 having the walls thereof undercut at 26 to coöperate with the undercut walls of the recess 2 of the main holder. The application and position of the clamping block in the main tool holder will be obvious, being clearly shown in Fig. 4 of the drawings.

What is claimed is:—

1. A tool holder including a main clamping plate, an edge clamping plate, means for adjusting the edge clamping plate with relation to the main clamping plate, said clamping plates being together formed to provide a tool receiving recess having undercut walls, and a tool post engaging plate secured to the main clamping plate.

2. A tool holder including a main clamping plate, an edge clamping plate, means for adjusting the edge clamping plate with relation to the main clamping plate, said clamping plates being together formed to provide a tool receiving recess having undercut walls, and a tool post engaging plate removably secured to and in spaced parallel relation to the main clamping plate.

3. A tool holder including a main clamping plate, an edge clamping plate, means for adjusting the edge clamping plate with relation to the main clamping plate, said clamping plates being together formed to provide a tool receiving recess having undercut walls, and an adjusting screw carried by the main clamping plate.

4. A tool holder including a main clamping plate, an edge clamping plate, means for adjusting the edge clamping plate with relation to the main clamping plate, said clamping plates being together formed to provide a tool receiving recess having undercut walls, and an adjusting screw carried by the main clamping plate.

5. A tool holder including a main clamping plate, an edge clamping plate, means for adjusting the edge clamping plate with relation to the main clamping plate, said clamping plates being together formed to provide a tool receiving recess having undercut walls, a stud movably connected to the main clamping plate, and an adjusting screw threaded to the stud.

6. A tool holder including a main clamping plate, studs projecting laterally therefrom and having reduced threaded bolt ends, an edge clamping plate arranged at right angles to the main clamping plate, screw bolts passed through the edge clamping plate and seating in the studs, said edge and main clamping plates being together formed to provide a tool receiving recess having undercut walls, and a tool post engaging plate removably engaging the threaded bolt ends of the studs.

7. A tool holder including coöperating clamping plates together formed to provide a recess having undercut walls, means for connecting the plates to adjust the recess walls with relation to each other, and a clamp block formed with a tool receiving recess and having a web projection to engage said walls.

8. A tool holder including coöperating clamping plates together formed to provide a recess having undercut walls, means for connecting the plates to adjust the recess walls with relation to each other, and a clamp block having a web projection to be secured between said recess walls, said clamp block being formed with a tool receiving recess having the bottom wall formed with a longitudinally extending slot.

9. A lathe tool holder designed for coöperation with a tool post, a plate adapted to be permanently secured in the tool post, a tool carrier adjustably connected with the plate, and an adjusting screw mounted on the carrier and providing means by which the carrier may be adjusted vertically with relation to the plate and tool post.

10. A lathe tool holder designed for coöperation with a tool post, a plate adapted to be permanently secured in the tool post, a tool carrier arranged parallel to the plate, and means on one side of the carrier, said means having an adjustable connection with the plate, so that the carrier may be adjusted in a vertical plane with relation to the plate and post.

11. A lathe tool holder designed for coöperation with a tool post, a plate adapted to be permanently secured in the tool post, a tool carrier arranged parallel to the plate, means on one side of the carrier having an adjustable connection with the plate, and an adjusting screw mounted on the opposite side of the carrier and resting upon the base of the tool post.

12. A lathe tool holder designed for coöperation with a tool post, a plate adapted to be permanently secured in the post and provided with elongated slots, a tool carrier arranged parallel to the plate, bolts mounted on one side of the carrier and arranged in the slots, nuts on the bolts, and an adjusting screw mounted on the other side of the carrier.

In testimony whereof I affix my signature in presence of two witnesses.

THOMAS B. VAN AUKEN.

Witnesses:
ROBERT J. BUNITT,
FRANCIS C. RAINES.

Copies of this patent may be obtained for five cents each, by addressing the " Commissioner of Patents, Washington, D. C."